United States Patent
Ogawa et al.

(10) Patent No.: US 6,461,459 B1
(45) Date of Patent: Oct. 8, 2002

(54) METHOD AND APPARATUS FOR FORMING TIRE REINFORCING LAYER

(75) Inventors: Yuichiro Ogawa, Fuchu; Keiichi Takabayashi, Urawa, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/550,206

(22) Filed: Apr. 17, 2000

(30) Foreign Application Priority Data

Apr. 19, 1999 (JP) ............................................. 11-110609

(51) Int. Cl.[7] ........................ B29D 30/38; B29D 30/16; B29D 30/30
(52) U.S. Cl. ........................ 156/117; 156/133; 156/134; 156/264; 156/397; 156/406.4
(58) Field of Search .................................. 156/117, 130, 156/133, 134, 177, 397, 264, 265, 266, 406.4

(56) References Cited

U.S. PATENT DOCUMENTS 1,728,957 A  9/1929  Dickinson 3,826,297 A * 7/1974 Alderfer ...................... 152/542
5,281,289 A  1/1994 Debroche et al.

FOREIGN PATENT DOCUMENTS

FR  1317045  3/1962
WO  WO99/17920  * 4/1999  .................. 156/117

* cited by examiner

*Primary Examiner*—Geoffrey L Knable
(74) *Attorney, Agent, or Firm*—Oliff & Berridge, PLC

(57) ABSTRACT

Method and apparatus for highly efficiently forming a tire reinforcing layer, such as a carcass ply or belt ply, either directly or indirectly on a rubber member which is supported on a rigid core having a toroidal shape. According to the invention, a continuous strip of reinforcing material comprised of a plurality of single cords or twisted cords is cut into reinforcing elements having a predetermined length. The reinforcing elements are successively fed to the rubber member from one side of the core, synchronously with an indexing movement of the core about its center axis. The reinforcing elements are then urged against the outer surface of the rubber member on the core along their longitudinal direction and thereby progressively pressure-joined to the rubber member.

6 Claims, 8 Drawing Sheets

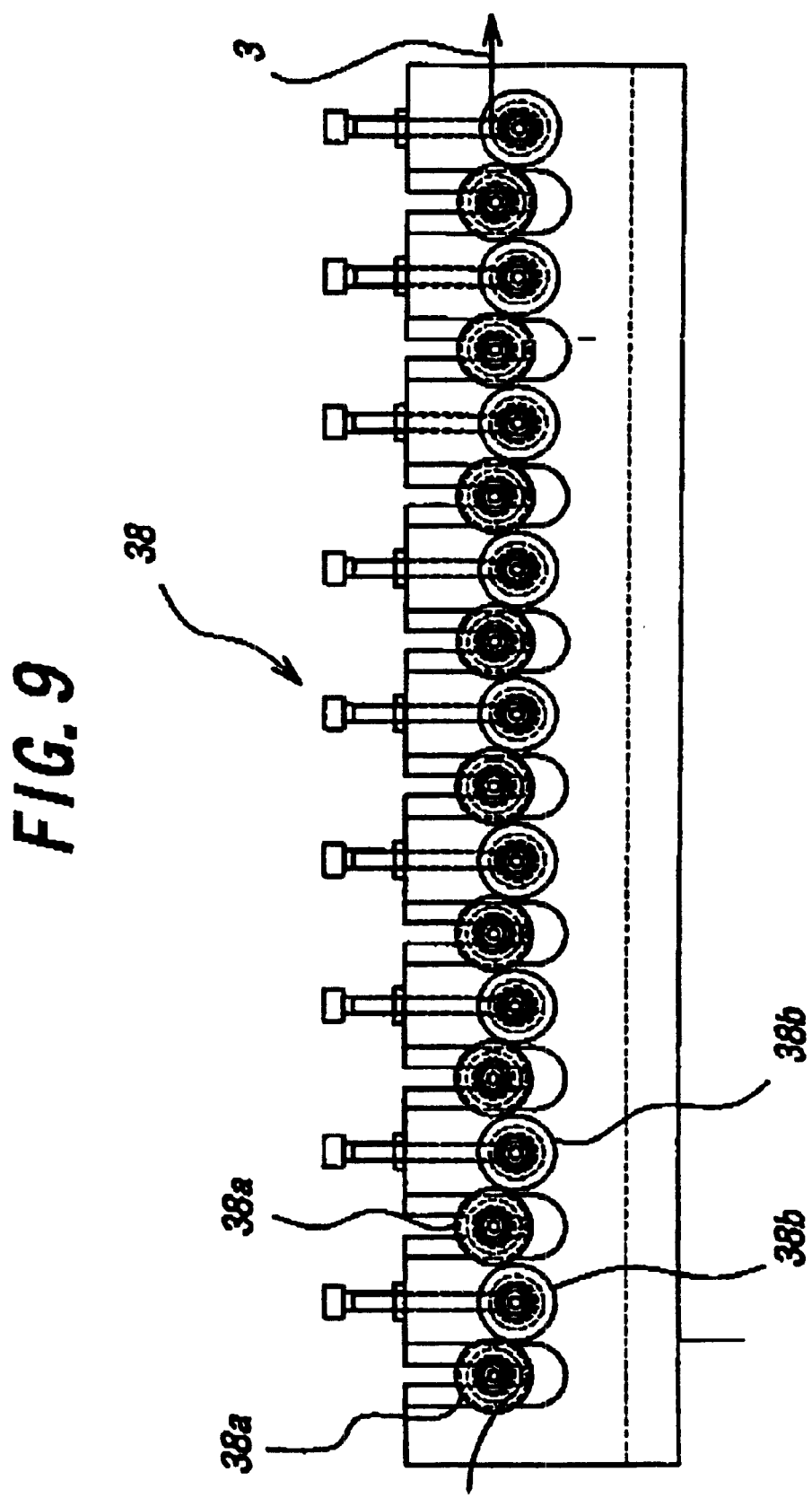

METHOD AND APPARATUS FOR FORMING TIRE REINFORCING LAYER

BACKGROUND OF THE INVENTION

1. Field of the Invention

The present invention relates to a method for forming a tire reinforcing layer, such as a carcass ply or a belt ply, either directly or indirectly on the outer circumferential surface of rubber member that is supported on a rigid core having a toroidal shape, and also to an apparatus which can be suitably used for carrying out the method.

2. Description of the Related Art

Conventional system for forming a tire reinforcing layer on a rigid core is disclosed, for example, in U.S. Pat. No. 5,281,289. In such a system, an installation head supports a reinforcing material in the form of a single cord, and is moved toward one side of a crown portion of the core which is under a slow rotation. With the leading end of the reinforcing material gripped and held by a clip, the installation head is moved in a diagonal direction from one side to the other of the core along the surface of the crown portion. Thus, the reinforcing material fed through the installation head is applied to the surface of the crown portion of the rubber member, with a predetermined inclination angle relative to the equatorial line of the core. Subsequently, the reinforcing material is cut by a cutter, at a position which is spaced a predetermined distance from the leading end. These process steps are repeated so that the reinforcing materials are joined to the outer circumferential surface of the rubber member one after another and in parallel with each other, thereby forming a tire belt layer on the core.

Since the reinforcing material to be applied to the outer circumferential surface of the rubber member is comprised of a single cord as explained above, it is necessary to perform the joining operation of the reinforcing material for a number of times in order to form a complete reinforcing belt layer. Therefore, with the known system, it has been difficult to realize improved work efficiency and productivity.

Furthermore, the application of the reinforcing material is performed by moving the installation head in the longitudinal direction of the reinforcing material. Thus, there is another problem that, when the inclination angle of the reinforcing material relative to the equatorial line of the core is small and the reinforcing material has a large length, it is necessary to move the installation head over a relatively long distance, i.e., a distance equal to the length of the reinforcing material. This makes it further difficult to achieve an efficient formation of a reinforcing layer with an improved productivity.

DISCLOSURE OF THE INVENTION

In view of the above-mentioned problems of the conventional system, it is a primary object of the present invention to provide improved method and apparatus for forming a tire reinforcing layer either directly or indirectly on the outer circumferential surface of a rigid core with higher efficiency and improved productivity.

According to one aspect of the present invention, there is provided a method for forming a tire reinforcing layer, wherein a continuous strip of a reinforcing material comprised of a plurality of single cords or twisted cords is cut into reinforcing elements having a predetermined length, and the reinforcing elements are each joined onto an entire outer circumferential surface of a rubber member on a rigid core having a toroidal shape, which is being subjected to an indexing movement about its center axis. The reinforcing elements are successively fed onto the outer circumferential surface of the rubber member from its one side, synchronously with the indexing motion of the core, and are then urged against the outer circumferential surface of the rubber member along their longitudinal direction and thereby successively pressure-joined to the rubber member.

With the above-mentioned method according to the present invention, it is possible to form a tire reinforcing layer, such as a belt layer, on the outer circumferential surface at the crown portion of a carcass, with higher efficiency and improved productivity as compared to the conventional system. This is because a plurality of cords are simultaneously pressure-joined to the outer circumferential surface of the rubber member on the rigid core. Furthermore, the reinforcing elements are urged against, and thereby tightly pressure-joined to the outer circumferential surface of the rubber member over the entire length thereof, e.g., by the urging operation of a pressure roll. It is thus possible to achieve a significantly improved joining of the reinforcing element to the rubber member while simultaneously avoiding entrapment of air therebetween. The entrapment of air can be more effectively prevented by pressure-joining the reinforcing element to the outer circumferential surface of the rubber member progressively from the leading end to the trailing end thereof.

Furthermore, according to the present invention, the joining of the respective reinforcing elements to the outer circumferential surface of the rubber member is performed based on a rotational movement of the core itself. Thus, by suitably selecting the rotational speed of the core, the joining of the reinforcing element can be performed within a minimized time even when the angle defined between the equatorial line of the core and the reinforcing element is small and the reinforcing element is relatively long. Therefore, the work efficiency of joining the reinforcing element can be advantageously improved, in contrast to the conventional system in which an installation head forming part of the mechanism is reciprocated.

With the method according to the present invention, the reinforcing element to be pressure-joined may be set at a predetermined inclination angle with reference to the equatorial line of the core, as a result of inclination of the center axis of the core by a predetermined angle within a vertical plane including the axis. It is however preferred that the setting of the inclination angle of the reinforcing element is performed by gradually changing the joining position of the reinforcing element relative to the outer circumferential surface of the rubber member in the longitudinal direction of the reinforcing element and in the width direction of the core, by displacing the reinforcing element in the axial direction of the core while rotating the core. In the latter case, the inclination angle of the reinforcing element relative to the equatorial line of the core can be readily set over a wide range and in a precise manner, without any particular operations, simply by suitably selecting the rotational speed of the core and the feeding speed of the reinforcing element.

Furthermore, according to the present invention, the side edges of adjacent reinforcing elements may be successively joined to each other on the circumferential surface of the rubber member. In this instance, it is preferred that the indexing movement of the core is performed by a normal rotation of the core for joining the reinforcing element to the rubber member, in combination with a reverse rotation of the core for returning the core to a starting position for joining a next reinforcing element.

Alternatively, the reinforcing elements may arranged on the outer circumferential surface of the rubber member on the core, while leaving a gap between opposite side edges corresponding to at least one sheet of the reinforcing element between the respective reinforcing elements, so that another reinforcing element can be arranged at the region of the rubber member corresponding to the gap. In this instance, it is preferred that the indexing operation of the core also serves as a normal rotation for joining the reinforcing element to the rubber member, such that the respective reinforcing elements are pressure-joined, at a first turn of the core, to the outer circumferential surface of the rubber member so as to leave the gap therebetween, and the successive reinforcing elements are pressure-joined to the region of the rubber member corresponding to the gap at the second and subsequent turns of the core.

In either case, it is preferred that the reinforcing element is pressure-joined to the outer circumferential surface of the rubber member by a pressure roll which is adapted to roll over the reinforcing element from its one end to the other. Such a pressure roll ensures that the reinforcing member in its entirety can be pressure-joined to the outer circumferential surface of the rubber member smoothly, uniformly and sufficiently tightly.

According to another aspect of the present invention, there is provided an apparatus for forming a tire reinforcing layer, comprising: a rigid core having an outer circumferential surface with a predetermined width, for supporting a rubber member thereon and adapted to be rotated about its center axis in normal and reverse directions; reinforcing element feed means for feeding a reinforcing element obtained by cutting a continuous strip of reinforcing material into a predetermined-length, from a predetermined feed direction onto an outer surface of the rubber member on the core; pressure-joining means for urging the reinforcing element against the outer circumferential surface of the rubber member and thereby pressure-joining the reinforcing element to the rubber member over the entire length of the reinforcing element; and lateral travel means for integrally displacing the feed means and the pressure-joining means in an axial direction of the core.

With the apparatus according to the present invention, the reinforcing element is fed to the outer circumferential surface of the rubber member by the reinforcing element feed means while the core is rotated at a predetermined speed in normal direction about the horizontal enter axis of the core. Simultaneously, the reinforcing element is progressively urged against the outer circumferential surface of the rubber member from its leading end to the trailing end, by the pressure-joining means which is preferably comprised of a pressure roll. Thus, the reinforcing element can be pressure-joined over its entire length to the rubber member sufficiently tightly, without any entrapment of air therebetween.

Furthermore, the reinforcing element feed means and the pressure-joining means can be displaced in the axial direction of the core at a required speed by the lateral travel means with a predetermined relation to the rotational speed of the core, so that the longitudinal direction of the reinforcing element on the outer circumferential surface of the rubber member can be set to the desired angle with reference to the equatorial line of the core. This angle can be readily changed as required, by suitably selecting the rotational speed of the core and the feeding speed of the reinforcing element.

It is preferred that the apparatus according to the invention further comprises inclination means for inclining the reinforcing element feed means and the pressure-joining means within a plane that is perpendicular to the predetermined feed direction of the reinforcing element. Such inclination means serves to positively ensure that the feeding direction of the reinforcing element can be readily aligned with the direction in which it is to be pressure-joined to the rubber member. As a result, the processes from the feeding step to the pressure-joining step of the reinforcing element can be smoothly performed without being affected by external forces acting in the twisting, tensioning or compressing direction relative to the reinforcing element. It is therefore possible to fully eliminate dislocation or deformation of the reinforcing element after it has been pressure-joined to the outer circumferential surface of the rubber member on the core.

It is preferred that the apparatus according to the present invention further comprises auxiliary feed means for assisting the reinforcing element feed means, in order to positively and smoothly feed the reinforcing element to the outer circumferential surface of the rubber member synchronously with the rotation of the core, and under the operation of this auxiliary feeding means.

It is also preferred that the apparatus according to the present invention further comprises drive means, e.g., a cylinder, for advancing and retracting the pressure-joining means relative to the outer circumferential surface of the core. With such drive means, the pressure-joining means can be advanced to urge the reinforcing element against the rubber member with a required force during the operation of the pressure-joining means, and the pressure-joining means can be retracted and separated from the outer circumferential surface of the core when the pressure-joining means is out of operation.

It is also preferred that the apparatus according to the present invention further comprises at least one of (i) cutter means for cutting a continuous strip of reinforcing material into the reinforcing elements having a predetermined length, (ii) drawer means for drawing out the continuous strip of the reinforcing material from a feed roll toward the cutter means, and (iii) correction means for eliminating a deformation tendency, such as a curling tendency, of the continuous strip of the reinforcing material as it has been drawn out of the feed roll by the drawer means.

BRIEF DESCRIPTION OF THE DRAWINGS

The present invention will be further described with reference to a preferred embodiment shown in the accompanying drawings, in which:

FIG. 9 is an enlarged side view showing a group of correction rolls.

DETAILED DESCRIPTION OF THE PREFERRED EMBODIMENT

Figure 1:
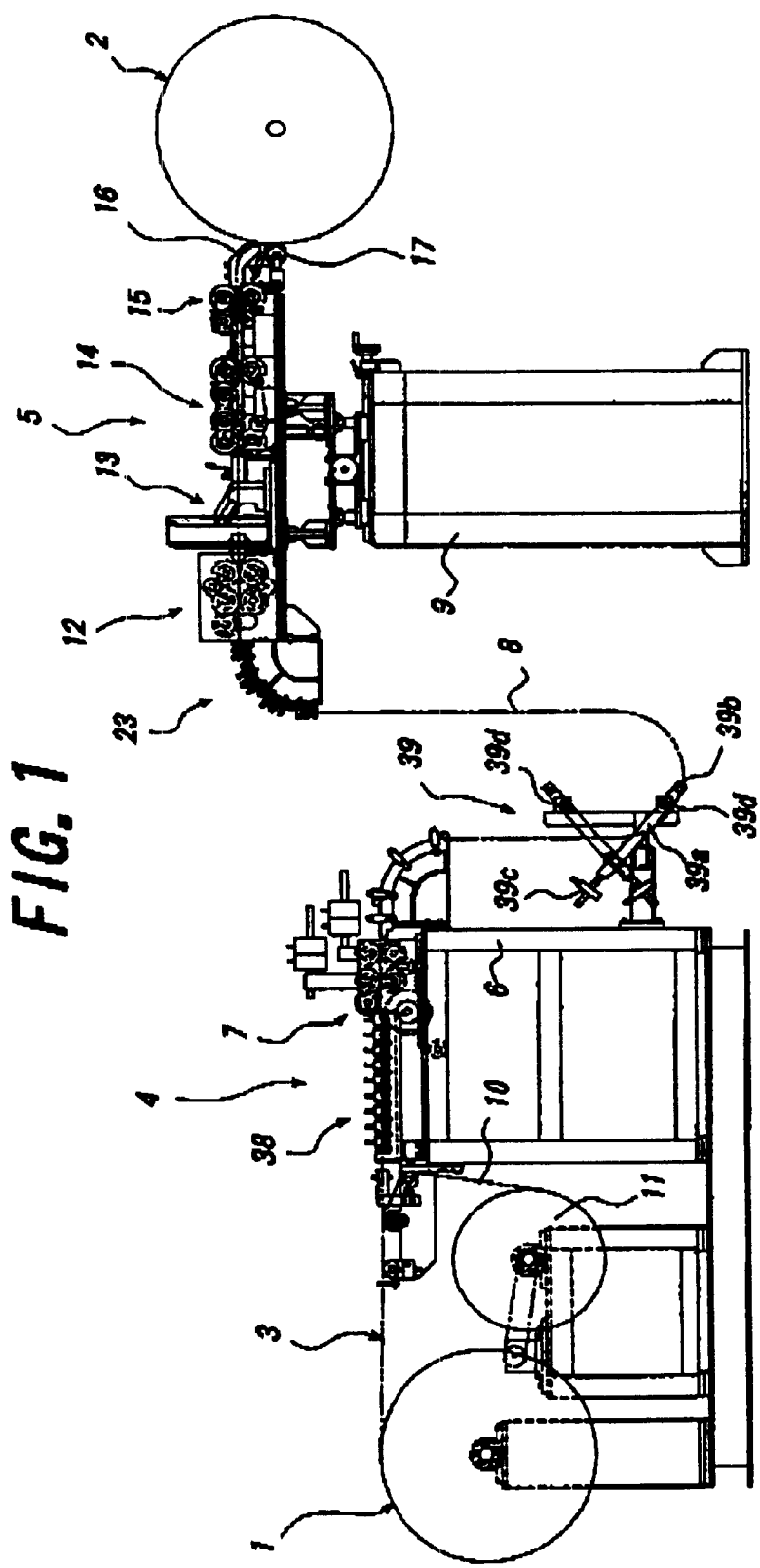
FIG. 1 is a side view showing an embodiment of the apparatus according to the present invention.
Figure 2:
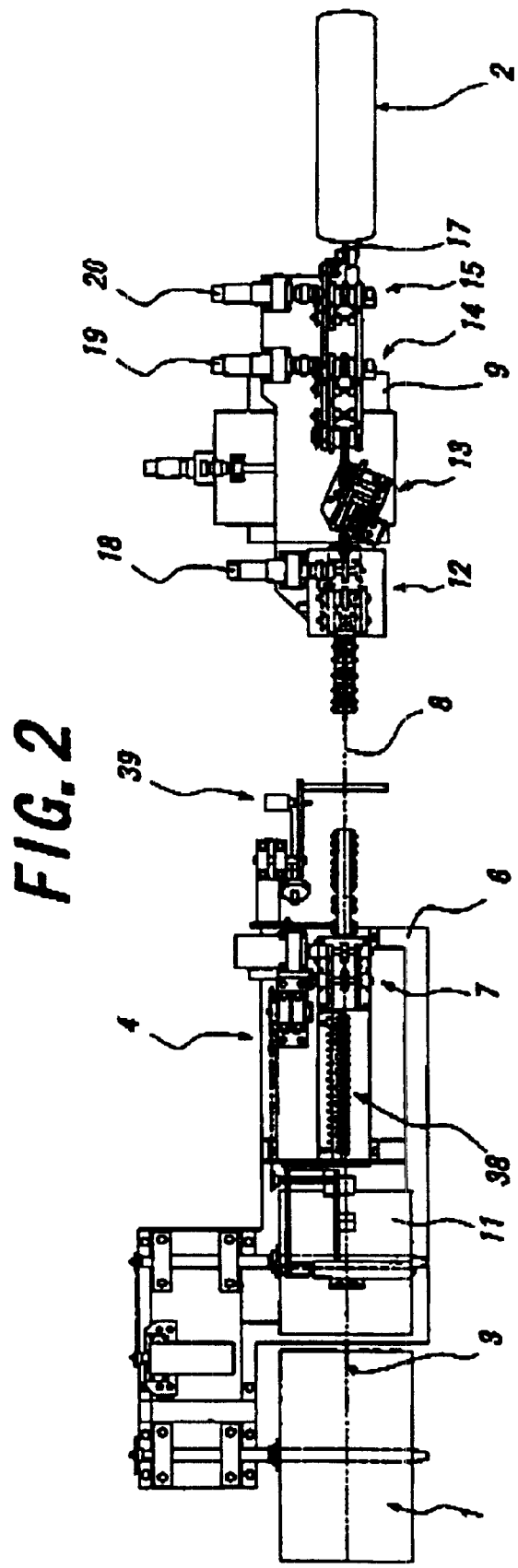
FIG. 2 is a plan view of major parts in the apparatus of FIG. 1.

Referring now to FIG. 1, there is shown an apparatus for forming a tire reinforcing layer according to one embodiment of the present invention. The apparatus includes a feed roll 1 on which a continuous strip 3 of reinforcing material has been previously wound. The strip 3 has a width which is typically on the order of 5 to 15 mm, and is comprised of a plurality of single cords or twisted cords which are coated by rubber. These cords extend either linearly or in a zigzag manner, in parallel with each other. A liner 10 is interposed between neighboring turns of the strip 3, for preventing adhesion of the neighboring turns with each other.

The apparatus further includes a rigid core 2 having an outer circumferential surface on which a tire reinforcing layer is formed. To this end, the continuous strip 3 of the reinforcing material is unwound and drawn from the feed roll 1 and cut into reinforcing elements having a predetermined length, which are then successively joined over the entire outer surface of the rubber member on the core 2. The core 2 is in the form of a rigid support with a substantially toroidal shape, having a substantially flat or slightly crowned outer surface and a width that is determined in accordance with the size of tires to be produced.

It is assumed that the outer surface of the core 2 is covered by a rubber member which may be an inner liner of a tire when the reinforcing layer to be formed is a carcass ply. Alternatively, the rubber member covering the core 2 may be a carcass ply when the reinforcing element to be formed is a belt ply.

A drawer mechanism 4 is arranged adjacent to the feed roll 1, for drawing out the continuous strip 3 of reinforcing material from the feed roll 1. A joining mechanism 5 is arranged adjacent to the core 2, for cutting the continuous strip 3 into reinforcing elements having a predetermined length and successively joining the reinforcing elements onto the outer surface of the rubber member covering the core 2. Typically, the feed roll 1, the core 2, the drawer mechanism 4 and the joining mechanism 5 are aligned with each other along a common straight line.

The drawer mechanism 4 includes a support frame 6 arranged in front of the roll 1, and a plurality of pull rolls 7 which are supported on the frame 6. The pull rolls 7 are driven by a motor and serve to sandwich the strip 3 from the upper and lower sides thereof and to continuously feed the strip 3 toward the joining mechanism 5 while controlling the position of the strip 3 in its width direction. The continuous strip 3 fed by the drawer mechanism 4 forms a festoon 8 before it is passed to the joining mechanism 5 which is supported on another frame 9. In this instance, it is assumed that the liner 10 between adjacent turns of the continuous strip 3 on the feed roll 1 is separated from the strip 3 as it is continuously drawn out, and is wound by a reel 11 which is driven by a motor.

On the other hand, the continuous strip 3 fed to the joining mechanism 5 is successively fed to a constant-length feed mechanism 12 and a cutter 13. The constant-length feed mechanism 12 is operated intermittently to advance the strip 3 of the reinforcing material by a predetermined constant distance. The cutter 13 is operated alternately with the constant-length feed mechanism 12 so as to cut the continuous strip 3 into the reinforcing elements having a predetermined constant length, typically at a desired inclination angle relative to the width direction of the strip 3. In this instance, the intermittent feeding of the strip 3 due to the operation of the constant-length feed mechanism 12 can be sufficiently compensated for by reduction in length of the festoon 8.

Further, after the reinforcing element with a predetermined length has been formed by the cutter 13, the reinforcing element is fed onto the outer surface of the rubber member covering the core 2, by main feed rolls 14 and auxiliary feed rolls 15. In the illustrated embodiment, in order to ensure a smooth and positive joining of the reinforcing element to the outer surface of the rubber member on the core 2, there is arranged a guide member 16 on the downstream side of the auxiliary feed rolls 15, for sandwiching the reinforcing element from both sides and resiliently deflecting the reinforcing element downwards. It is preferred that an apron guide is further arranged on the downstream side of the guide member 16, for controlling the position of the reinforcing element in its width direction and feeding the reinforcing element onto the outer surface of the rubber member in a tangential direction of the core 2.

The apron guide has a tip end that is provided with a pressure roll 17 for urging the reinforcing element onto the outer surface of the rubber member on the core 2. The pressure roll 17 is adapted to be advanced and retracted by a cylinder device as desired, relative to the outer circumferential surface of the core 2.

Figure 3:
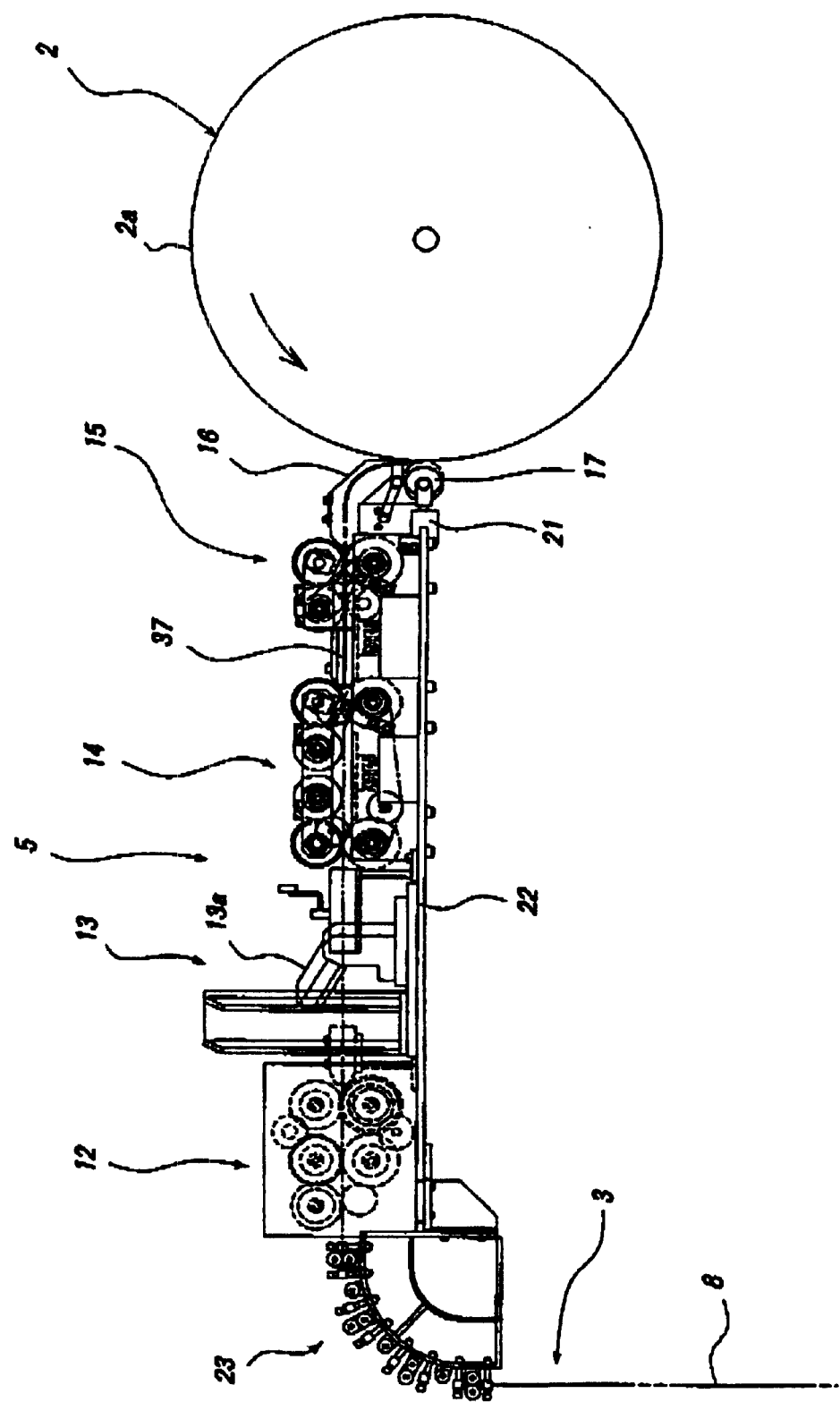
FIG. 3 is a partial side view showing the joining mechanism together with the core on which the reinforcing layer is formed.
Figure 4:
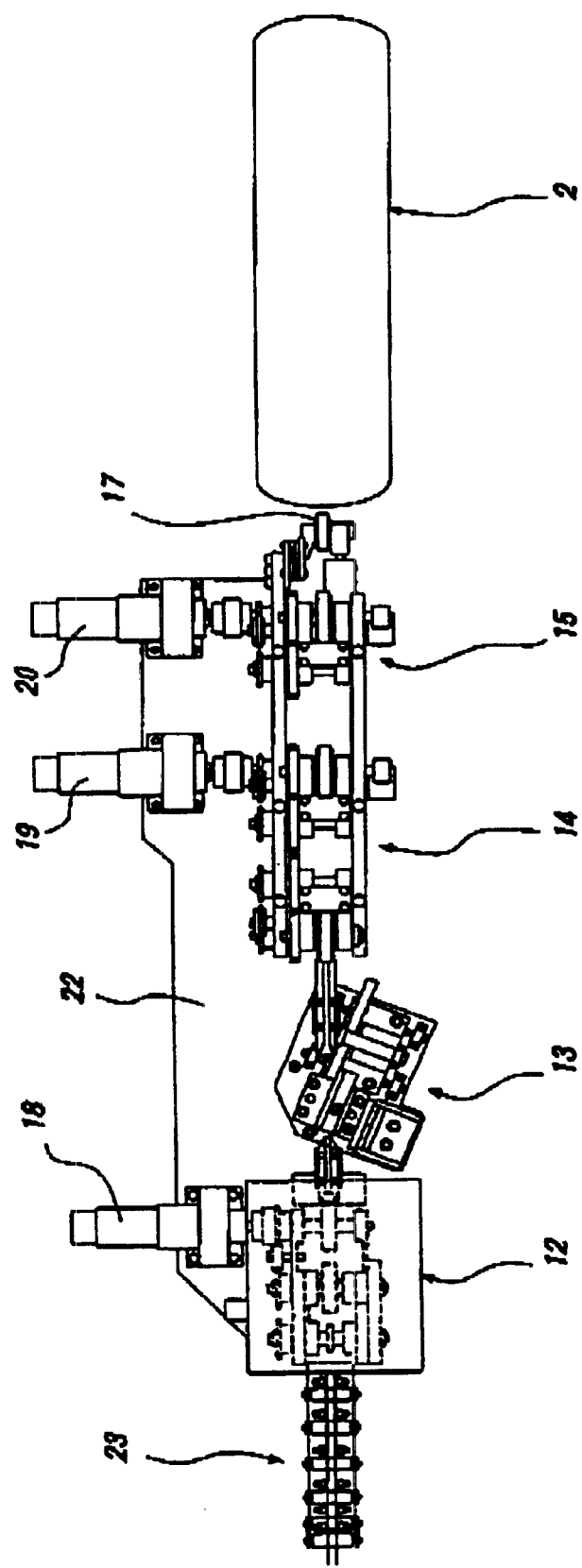
FIG. 4 is a plan view of the joining mechanism of FIG. 3.

A detailed arrangement of the joining mechanism 5 on the support frame 9 is shown in FIG. 3 and FIG. 4 in an enlarged scale, together with the core 2. The constant-length feed mechanism 12, the main feed rolls 14 and the auxiliary feed rolls 15 are each comprised of upper and lower pinch rolls for sandwiching the strip 3 of reinforcing material or the reinforcing element from both sides. These pinch rolls are operated at predetermined timings by motors 18, 19 and 20, respectively, for feeding the continuous strip 3 or the reinforcing element made therefrom, along a straight path as seen in the plan view of FIG. 4, while controlling the position in the width direction.

The constant-length feed mechanism 12 is capable of intermittently and precisely feeding a predetermined constant length of the continuous strip 3 by actuating the motor 18 for a predetermined time period after detecting the leading end of the strip 3 by a sensor or feed counter which is comprised of a servo motor, not shown. In this instance, the main feed rolls 14 cooperate with the constant-length feed means 12 to advance the strip 3, and also with the auxiliary feed rolls 15 to feed the reinforcing element, which has been formed by the cutter 13, onto the outer surface of the rubber member on the core 2. The auxiliary feed rolls 15 assist the main feed rollers 14 to advance the continuous strip 3, particularly when the reinforcing element to be formed is relatively long.

The reinforcing element fed toward the core 2 is tightly pressure-joined onto the outer surface of the rubber member on the core 2. To this end, the cylinder device 21 is actuated to advance the pressure roll 17 synchronously with the rotational movement of the core 2, such that the reinforcing element is urged against the outer surface of the rubber member by the pressure roll 17 with a desired force.

The cutter 13 arranged between the constant-length feed mechanism 12 and the main feed rolls 14 may be comprised of a bell crank having a pair of arms and an intermediate portion therebetween, which is pivotally connected to a base plate 22. One arm of the bell crank 13 has a cutting edge 13a which is arranged with a predetermined inclination angle relative to the feed direction of the continuous strip 3 of the reinforcing material. The cutting edge 13a is adapted to precisely cut the continuous strip 3 after it has been advanced by a predetermined distance by means of the constant-length feed mechanism 12. To this end, the other arm of the bell crank 13 may be connected to a cylinder device and thereby rotated about the pivot downwards to forcibly drive the cutting edge 13a into the strip 3.

A guide device 23 is provided on the upstream side of the constant-length feed mechanism 12, for ensuring that the continuous strip 3 of the reinforcing material on the downstream side of the festoon 8 is properly guided into the constant-length feed mechanism 12, while mitigating or eliminating the curling tendency of the strip 3, if any. The guide device 23 has predetermined clearances relative to the strip 3 in the thickness and width directions of the strip 3. These clearances serve to avoid occurrence of deformation, such as bending and/or twisting in the festoon 8 upon lateral displacement and inclination of the base plate 22 and elements thereon to be described hereinafter, so as to normally ensure a smooth entry of the continuous strip 3 on the downstream side of the festoon 8 into the constant-length feed mechanism 12.

Figure 5A:
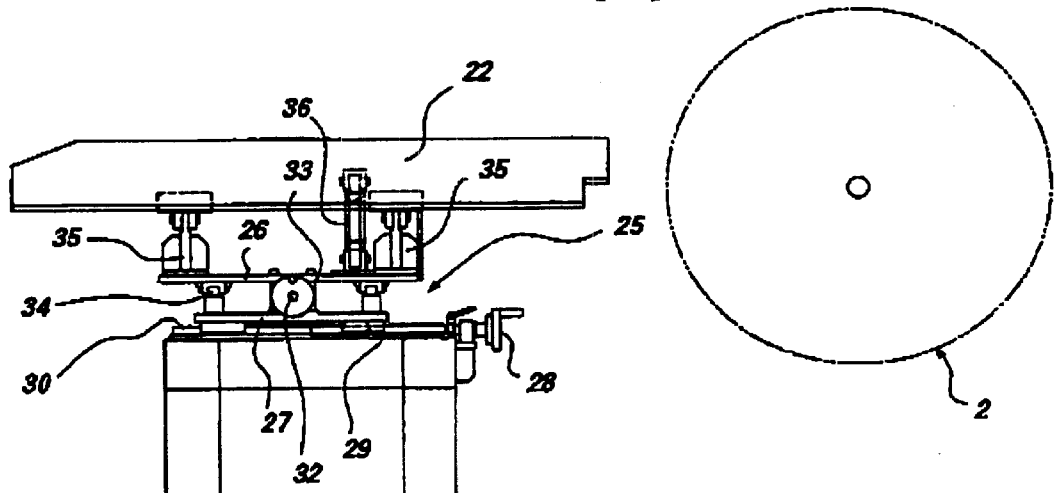
FIG. 5(a) and FIG. 5(b) are side view and plan view, respectively, showing laterally traveling mechanism for the base plate.
Figure 5B:
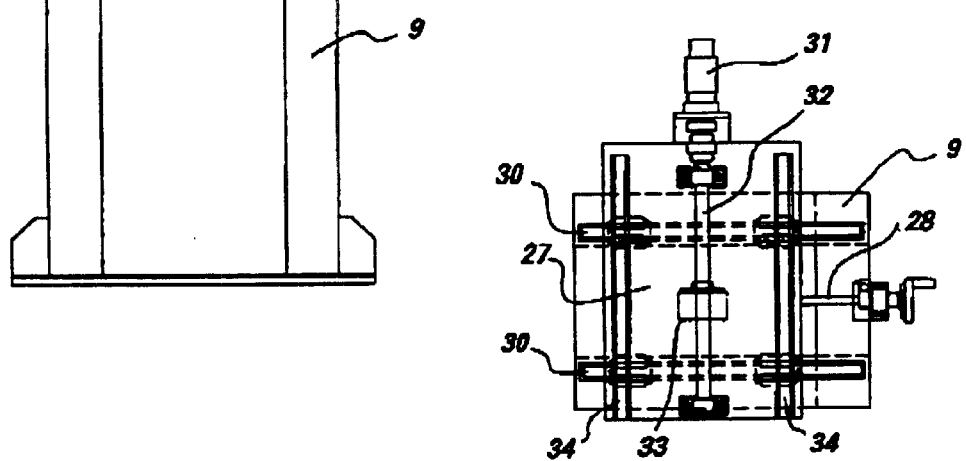

In order to cause the above-mentioned lateral displacement of the base plate 22, i.e., the displacement of the base plate 22 in the axial direction of the core 2, there is provided a crosshead 25 on the support frame 9, as shown in FIG. 5(a) and FIG. 5(b). The crosshead 25 is adapted to be displaced within a horizontal plane, in a direction perpendicular to the center axis of the core 2 and also in the axial direction of the core 2. The crosshead 25 has an upper horizontal plate 26 which is connected to the base plate 22. It is noted that the base plate 22 and the upper horizontal plate 26 of the crosshead 25 are omitted from FIG. 5(b) for the sake of clarity.

The crosshead 25 has a lower horizontal plate 27 which is adapted to be horizontally displaced together with the upper horizontal plate 26 in a direction perpendicular to the center axis of the core. To this end, a male screw member 28 connected to a handle extends in a direction perpendicular to the center axis of the core 2 and is rotatably carried on the support frame 9 by a bearing. The male screw member 28 is threadedly engaged with a female screw member 29 attached at the lower surface of the lower horizontal plate 27. The lower horizontal plate 27 of the crosshead 25 is engaged with a pair or rails 30 provided on the support frame 9 to extend in the direction perpendicular to the center axis of the core. Thus, by operating the handle and thereby rotating the male screw member 28, it is possible to cause a horizontal displacement of the upper horizontal plate 26 and the lower horizontal plate 27 of the crosshead 25 in the direction perpendicular to the center axis of the core 2. Another male screw member 32 extends in the axial direction of the core 2 and rotatably connected to a motor 31 which is mounted on the lower horizontal plate 27. The male screw member 32 is threadedly engaged with a female screw member 33 which is provided on the upper horizontal plate 26. The upper horizontal plate 26 is engaged with a pair of rails 34 provided on the lower horizontal plate 27 to extend in the axial direction of the core 2. Thus, by actuating the motor 31 and thereby rotating the male screw member 32, it is possible to cause a lateral and horizontal displacement of the upper horizontal plate 26 of the crosshead 25 in the axial direction of the core 2.

In this way, the base plate 22 which is connected to the upper horizontal plate 26, as well as respective elements which are mounted on the base plate 22, can be displaced in a horizontal plane laterally with respect to the axial direction of the core 2.

Figure 6:
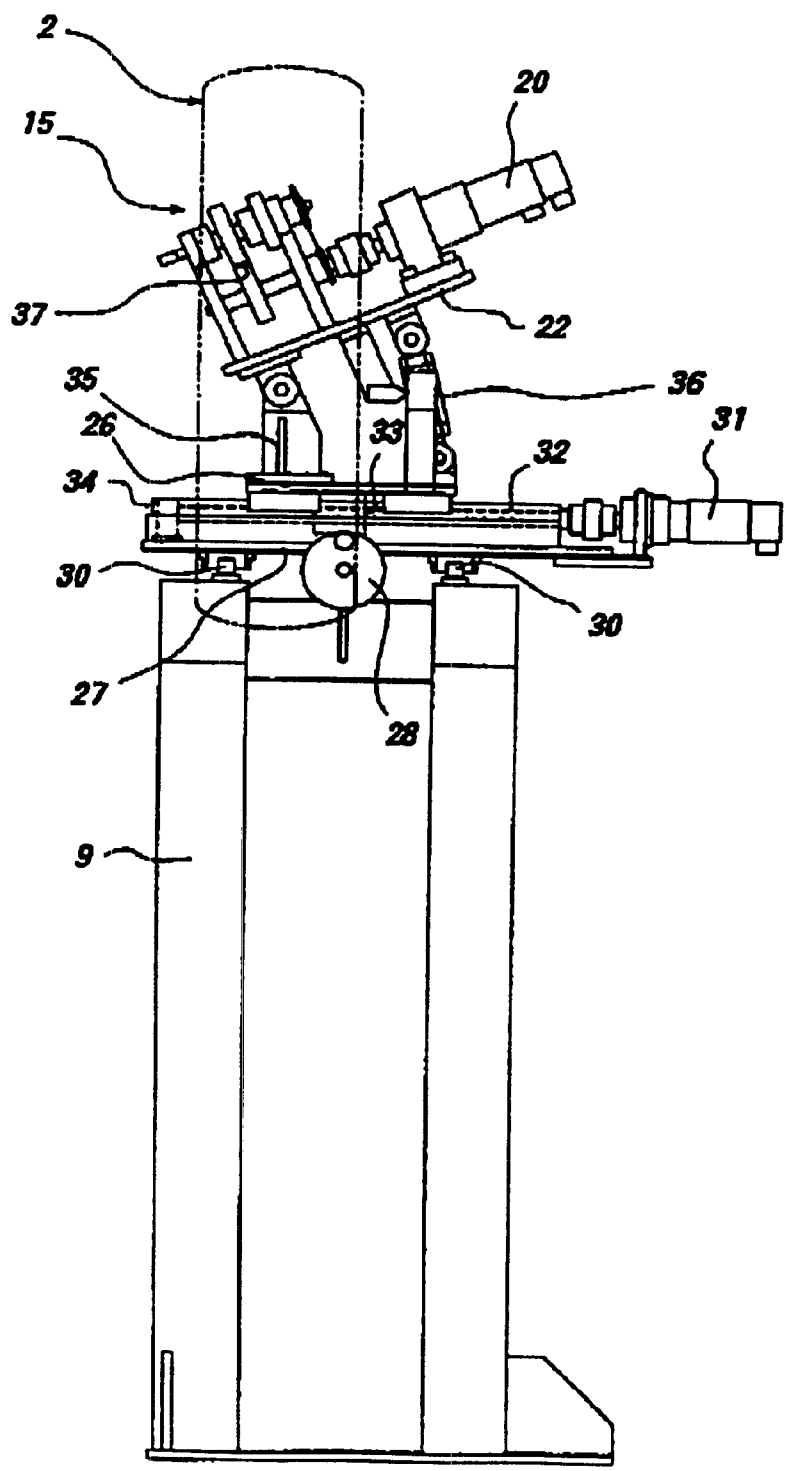
FIG. 6 is a front view of the inclining mechanism for the base plate.

As further shown in FIG. 6, the base plate 22 and the upper horizontal plate 26 are connected to each other in such a manner as to permit the above-mentioned inclination of the base plate 22. More particularly, one side of the base plate 22, which is situated remote from the motors 18, 19, 20, is pivotally connected to the upper horizontal plate 26 via a bracket 35, and another side of the base plate 22, which is opposite to the motors 18, 19, 20, is pivotally connected to the upper horizontal plate 26 via a cylinder device 36. The base plate 22, which is normally maintained at a horizontal posture parallel to the upper horizontal plate 26, can be brought into an inclined posture as shown in FIG. 6 by extending the piston rod of the cylinder device 36, along with all the elements on the base plate 22. In this instance, the inclination amount can be suitably adjusted by selecting the stroke of the cylinder device 36.

A similar adjustment of the inclination amount may be achieved by an appropriate screw means which is provided instead of the cylinder 36.

The cutting of the continuous strip 3 of the reinforcing material is performed at the location of the joining mechanism 5 as constituted above, by advancing the strip 3 by a predetermined distance toward the cutter 13 via the guide device 23 under an intermittent operation of the constant-length feed means 12, and subsequently operating cutter 13 and driving the cutter edge 13a into the continuous strip 3, as described above. The joining of the reinforcing element onto the outer surface of the rubber member on the core 2 is performed by feeding the reinforcing element from its leading end toward the core 2 by means of the main feel rolls 14 and the auxiliary feed rolls 15. In this instance, it is assumed that the angular position of the handle associated with the male screw member 28 shown in FIGS. 5(a) and 5(b) is adjusted in advance so that the base plate 22 and various elements thereon are situated sufficiently close to the core 2. The reinforcing element is deflected by the guide member 16 into a tangential direction of the core 2, while being simultaneously positioned in its width direction the apron guide. After completion of the indexing angular movement of the core 2, the pressure roll 17 is advanced by the cylinder device 21 to thereby urge the leading end portion of the reinforcing element onto the outer surface of the rubber member on the core 2 with a predetermined urging force. The core 2 is then rotated in a predetermined direction in order to successively urge the reinforcing element against the outer surface of the rubber member on the core 2 over its entire length, i.e., from the leading end up to the trailing end of the reinforcing element, to thereby pressure-join the entire reinforcing element to the outer surface of the rubber member on the core 2.

The reinforcing element pressure-joined to the rubber member on the core 2 may be used to form a belt layer for reinforcing a tread portion of a tire. It is noted that the cords of a tire belt layer typically extend in a direction intersecting the tire equatorial line. Thus, when the reinforcing element is comprised of a plurality of single cords or twisted cords which extend in parallel with each other in the longitudinal direction of the reinforcing element, for example, it is preferred that the reinforcing element itself extends in a direction that forms a predetermined angle α relative to the equatorial line of the core 2, as shown in FIG. 7.

Figure 7:
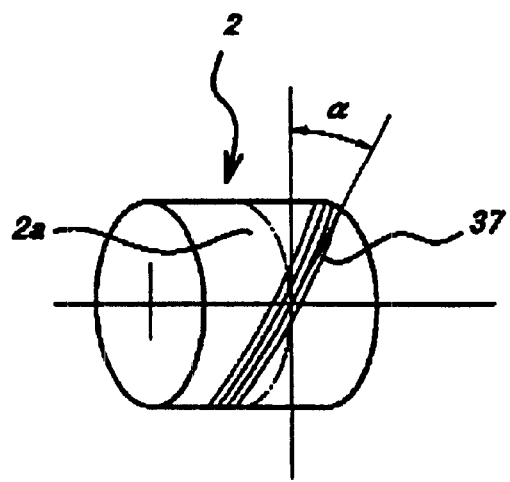
FIG. 7 is a schematic view showing the mode of joining a reinforcing element onto the outer surface of a rubber member on the core.

In this instance, the region where each reinforcing element 37 is urged against the outer surface of the rubber member 2a on the core 2 is gradually shifted in the width direction of the core 2, along with the rotation of the core 2 about its center axis and resultant apparent dislocation of the reinforcing element 37 itself in the axial direction of the core 2 as shown in FIG. 7. To this end, the crosshead 25 shown in FIG. 5 is moved synchronously with the rotation of the core 2 in a predetermined direction, so that the feed rolls 15 and the pressure roll 17 are laterally displaced together with the base plate 22 in the axial direction of the core 2. Here, the inclination angle α formed between the equatorial line of the core 2 and the reinforcing element 37 can be appropriately selected by adjusting the rotational speed of the core 2 and the lateral displacement speed of the crosshead 25 relative to each other.

For pressure-joining the reinforcing element 37 to the outer surface of the rubber member 2a on the core 2 in the manner described above, it is preferred that the cylinder device 36 connecting the base plate 22 to the upper horizontal plate 26 is extended as shown in FIG. 6 so that the base plate 22 is inclined about its pivot point at the bracket 35 to a predetermined height position. That is to say, the base plate 22 which has been inclined to the predetermined height position is situated within a plane that is perpendicular to the desired direction in which the reinforcing element 37 is to extend with reference to the rubber member 2a on the core 2. In other words, that region of the reinforcing element 37, which is being joined to the rubber member 2a, can be readily and positively aligned with the desired direction in which the reinforcing element 37 is to extend with reference to the rubber member 2a. Thus, even when the reinforcing element 37 is joined to the rubber member 2a with a predetermined inclination angle α as shown in FIG. 7, it is possible to positively and sufficiently prevent undesired twisting or the like deformation of the reinforcing element 37 and thereby ensure a smooth and precise joining of the reinforcing element 37 to the rubber member 2a on the core 2.

Figure 8A:
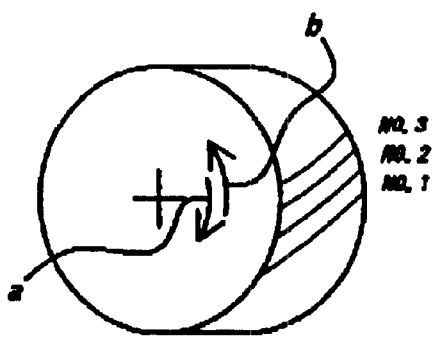
FIG. 8(a) and FIG. 8(b) are schematic views showing the mode of forming a reinforcing belt layer.

After one sheet of the reinforcing element 37 has been joined to the rubber member 2a at a predetermined position on its outer surface, and the core 2 is then subjected to an indexing rotation, a succeeding sheet of the reinforcing element 37 is joined to the rubber member 2a essentially in the same way, with the side edge of the succeeding reinforcing element 37 tightly joined to the corresponding side edge of the preceding reinforcing element 37 over the entire length, as shown in FIG. 8(a). By successively repeating these process steps with respect to the entire outer surface of the rubber member 2a, it is possible to form a complete reinforcing layer on the core 2.

The indexing operation of the core 2 upon formation of the reinforcing layer in the manner described above can be performed by combining a normal rotation of the core 2 for joining the reinforcing element 37 to the rubber member 2 as indicated by arrow "a" in FIG. 8(a), with a subsequent reverse rotation of the core 2 so that it is returned to the starting position for joining the succeeding reinforcing element 37 to the rubber member 2a as indicated by arrow "b" in FIG. 8(a).

Figure 8B:
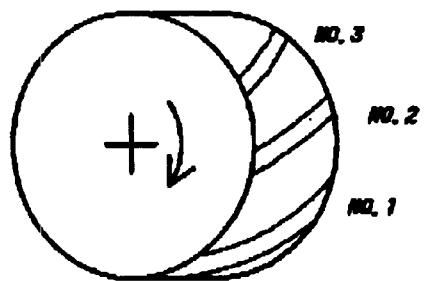

The indexing operation of the core 2 may be used as a normal rotation of the core 2 for joining the reinforcing element 37 to the rubber member 2a. In this instance, the pressure joining of the reinforcing elements 37 to the outer surface of the rubber member 2a can be performed by a first turn of rotation of the core 2, so that a gap is left between the adjacent sheets of the reinforcing elements 37, as shown in FIG. 8(b). The gap has a size corresponding to the width of at least one sheet of the reinforcing element 37. Succeeding sheets of the reinforcing elements 37 are then pressure-joined to the outer surface of the rubber member 2a by second and subsequent turns of rotation of the core 2, at regions corresponding to the gaps between the adjacent sheets of the preceding reinforcing elements 37, to thereby form a complete reinforcing layer on the core 2.

In any case, the movable elements such as auxiliary feed rolls 15 and pressure roll 17 are laterally moved in the width direction of the core 2, from its one side to the other, in order to perform pressure-joining of the reinforcing elements 37 to the rubber member 2a on the core 2. It is noted that, after one sequence of the pressure-joining process has been completed, the movable elements must be returned to their initial positions by the operation of the crosshead 25 so that a subsequent pressure-joining process can be started.

It is preferred that the drawer mechanism 4 is provided with a group of correction rolls 38 on the support frame 6 on the upstream side of the pull rolls 7. As particularly shown in FIG. 9 in enlarged scale, the correction rolls 38 may be comprised of a plurality of upper rolls 38a and lower rolls 38b which are arranged in a staggered manner, i.e., alternately on the upper and lower sides. Thus, before the continuous strip 3 of the reinforcing material as drawn out from the feed roll 1 reaches the pull rolls 7, the strip 3 is passed alternately along the lower surface sides of the upper rolls 38a and the upper surface sides of the lower rolls 38b, to thereby effectively eliminate a bending deformation, such as a curling tendency, in the thickness direction of the continuous strip 3 of the reinforcing material.

The upper rolls 38a and the lower rolls 38b of the correction rolls 38 may be mutually and alternately offset in the respective axial directions such that the continuous strip 3 of the reinforcing material has meandering paths defined by the flanges of the rolls 38a, 38b as seen in the plan view of the correction rolls 38. Such an arrangement is particularly advantageous for the continuous strip 3 of the reinforcing material having undesirable bending deformation of the continuous strip 3 in its width direction, since the passage of the strip 3 along the meandering paths serves to substantially eliminate the deformation.

It is also preferred that, as shown in FIG. 1, a sensor 39 is provided between the drawer mechanism 4 and the pressure-joining mechanism 5, for detecting the slack amount of the festoon 8 in the continuous strip 3 of the reinforcing material. The sensor 39 includes a swing arm 39a having an intermediate portion which is pivotally connected to the support frame 6. A rod 39b engageable with the bottom portion of the festoon 8 is provided at one end of the swing arm 39a, and a corresponding counterweight 39c is provided at the other end of the swing arm 39a. A permanent magnet is provided on the swing arm 39a and adapted to be electromagnetically engaged selectively with upper and lower limit switches 39d.

The sensor 39 is connected to a controller (not shown) so as to effectively stabilize the slack amount of the festoon 8. Thus, when the lower limit switch 39d is actuated by the permanent magnet on the swing arm 39a due to an increased slack amount of the festoon 8, a further increase of the slack amount is prevented by reducing the rotational speed of the pull rolls 7. On the contrary, when the upper limit switch 39d is actuated by the permanent magnet on the swing arm 39a due to a decreased slack amount of the festoon 8, a further decrease of the slack amount is prevented by increasing the rotational speed of the pull rolls 7.

It will be appreciated from the foregoing description that, according to the present invention, a tire reinforcing layer can be formed on a rigid core with markedly improved work efficiency and productivity, since reinforcing elements comprised of a plurality of cords are prepared and used as a unit to be successively pressure-joined to the outer surface of a rubber member on the core. The reinforcing element can be pressure-joined to the rubber member sufficiently tightly, without the risk of entrapment of air between the outer surface of the rubber member and the reinforcing element, since the reinforcing element is urged against the rubber member from its one end by the pressure-joining means. Furthermore, the pressure-joining of the reinforcing element can be performed highly efficiently even in the case of a long reinforcing element, since the reinforcing element is joined to the rubber member based on a rotational movement of the core itself at a predetermined speed.

What is claimed is:

1. A method for forming a tire reinforcing layer, wherein a continuous strip of a reinforcing material comprised of a plurality of single cords or twisted cords is cut into reinforcing elements having a predetermined length, and the reinforcing elements are each joined to an outer circumferential surface of a rubber member supported by a rigid core which is being subjected to an angular indexing motion about its center axis, said method comprising the steps of:

successively feeding the reinforcing elements onto the outer circumferential surface of the core from one side thereof, synchronously with the indexing motion of the core; and urging the respective reinforcing elements against the outer circumferential surface of the rubber member along their longitudinal direction simultaneous with rotation of the core, and thereby progressively pressure-joining the reinforcing elements to the rubber member.

2. The method according to claim 1, wherein the reinforcing elements are gradually displaced in an axial direction of the core so that the reinforcing elements are pressure-joined onto the outer circumferential surface of the rubber member at locations of the core which are gradually shifted in a width direction of said core.

3. The method according to claim 1, wherein the reinforcing elements are arranged adjacent to each other so that opposite side edges of the neighboring reinforcing elements are successively joined to each other on the outer circumferential surface of the rubber member.

4. The method according to claim 1, wherein the indexing motion of the core is performed by a normal angular motion of the core for joining the reinforcing element onto the outer circumferential surface of the rubber member, and a reverse angular motion of the core back to a predetermined position where a next reinforcing element is to be joined onto the outer circumferential surface of the rubber member.

5. The method according to claim 1, wherein said indexing motion of the core is performed by a normal angular motion of the core for joining the reinforcing element onto the outer circumferential surface of the rubber member, such that the reinforcing elements during a first turn of the core are pressure-joined to the outer circumferential surface of the rubber member while leaving a gap between the respective reinforcing elements, said gap having a size which corresponds to at least one sheet of the reinforcing element, and the reinforcing elements during the second and subsequent turns are pressure-joined to a region at the outer circumferential surface of the rubber member corresponding to said gap so as to form a tire reinforcing layer.

6. The method according to claim 1, wherein the reinforcing elements are pressure-joined onto the outer circumferential surface of the rubber member, by a pressure roll adapted to roll over the reinforcing element from its one end to the other.

* * * * *